United States Patent
Shiotani

(10) Patent No.: US 11,689,672 B2
(45) Date of Patent: Jun. 27, 2023

(54) NON-TRANSITORY COMPUTER-READABLE STORAGE MEDIUM AND INFORMATION PROCESSING DEVICE

(71) Applicant: BROTHER KOGYO KABUSHIKI KAISHA, Nagoya (JP)

(72) Inventor: Takeshi Shiotani, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/098,336

(22) Filed: Nov. 14, 2020

(65) Prior Publication Data
US 2021/0168249 A1  Jun. 3, 2021

(30) Foreign Application Priority Data
Nov. 28, 2019 (JP) .................... 2019-214972

(51) Int. Cl.
G06F 15/00 (2006.01)
H04N 1/00 (2006.01)

(52) U.S. Cl.
CPC ....... *H04N 1/00474* (2013.01); *H04N 1/0048* (2013.01); *H04N 1/00424* (2013.01); *H04N 1/00482* (2013.01)

(58) Field of Classification Search
CPC .......... H04N 1/00474; H04N 1/00424; H04N 1/0048; H04N 1/00482
USPC ........................................ 358/1.15
See application file for complete search history.

(56) References Cited

U.S. PATENT DOCUMENTS

| 6,822,765 B1 | 11/2004 | Ohmori |
| 9,459,822 B2 * | 10/2016 | Kang ................. G06F 3/1292 |
| 2017/0251124 A1 * | 8/2017 | Yasui ................. G06F 3/1292 |
| 2017/0346982 A1 * | 11/2017 | Yamada ............. H04N 1/00315 |
| 2018/0004367 A1 * | 1/2018 | Sento ................. G06F 3/04817 |

FOREIGN PATENT DOCUMENTS

| JP | 2001-148757 A | 5/2001 |
| JP | 2017-117293 A | 6/2017 |

* cited by examiner

*Primary Examiner* — Mark R Milia
(74) *Attorney, Agent, or Firm* — Kenealy Vaidya LLP

(57) ABSTRACT

A non-transitory computer-readable storage medium storing a control program, the control program, when executed by a computer of an information processing device, causes the information processing device to: perform first display processing in a case where it is determined that none of functions of the image processing apparatus is selected, the first display processing including displaying a status of the image processing apparatus; and perform second display processing in a case where it is determined that any one of the functions of the image processing apparatus is selected, the second display processing including: displaying a status of the image processing apparatus which is based on a status information relevant to a first function that is the selected function; and limiting display of a status of the image processing apparatus which is based on a status information relevant to a second function that is a function not selected.

9 Claims, 14 Drawing Sheets

FIG. 6

|  | NORMAL | ERROR | OFFLINE |
|---|---|---|---|
| TOP SCREEN | NOT DISPLAYED | ! | ≠ |
| FUNCTION EXECUTION SCREEN | ✔ | | |

NON-TRANSITORY COMPUTER-READABLE STORAGE MEDIUM AND INFORMATION PROCESSING DEVICE

CROSS-REFERENCE TO RELATED APPLICATIONS

This application is based upon and claims the benefit of priority from prior Japanese patent application No. 2019-214972, filed on Nov. 28, 2019, the entire contents of which are incorporated herein by reference.

TECHNICAL FIELD

The present disclosure relates to technology of causing an information processing device to display a status of an image processing apparatus.

BACKGROUND ART

Related art discloses an information processing device capable of performing communication with an image processing apparatus such as a printer and a complex machine and configured to acquire status information of the image processing apparatus via communication. The information processing device displays on a display a screen for setting a printing condition upon print processing by using the status information acquired from the printer, for example.

When the information processing device displays a status of the image processing apparatus on the display by using the status information acquired from the image processing apparatus, statuses that are displayed may include a status that is irrelevant to a function of the image processing apparatus currently selected by the user. For example, since the complex machine has the status information that is different for each of functions, a possibility that a status, which is not directly relevant to the function selected by the user, will be displayed on the display increases. In this case, there is concern that usability of the information processing device for the user may be lowered.

SUMMARY

An aspect of the present disclosure is to display a status of an image processing apparatus on a display without lowering usability of an information processing device for a user.

According to an aspect of the present disclosure, there is provided a non-transitory computer-readable storage medium storing a control program readable by a computer of an information processing device, the information processing device including a display, an operation unit, and a communication unit and capable of performing communication with an image processing apparatus via the communication unit, and the control program, when executed by the computer, causing the information processing device to perform: acquiring status information indicative of a status of the image processing apparatus via the communication unit; determining which function of functions of the image processing apparatus is selected; performing first display processing in a case where it is determined that none of the functions of the image processing apparatus is selected, the first display processing including displaying, on the display, a status of the image processing apparatus which is based on the acquired status information; and performing second display processing in a case where it is determined that any one of the functions of the image processing apparatus is selected, the second display processing including: displaying, on the display, a status of the image processing apparatus which is based on a status information included in the acquired status information and relevant to a first function that is the selected function; and limiting display, on the display, of a status of the image processing apparatus which is based on a status information included in the acquired status information and relevant to a second function that is a function not selected.

The present disclosure can be implemented in diverse forms. For example, the present disclosure can be implemented in a form of a control method for controlling an image processing apparatus, in addition to an apparatus such as an image processing apparatus.

BRIEF DESCRIPTION OF DRAWINGS

FIG. 6 illustrate examples of a badge image.

DESCRIPTION OF EMBODIMENTS

First Embodiment

A printing system in accordance with the present embodiment will be described with reference to the drawings.

Figure 1:
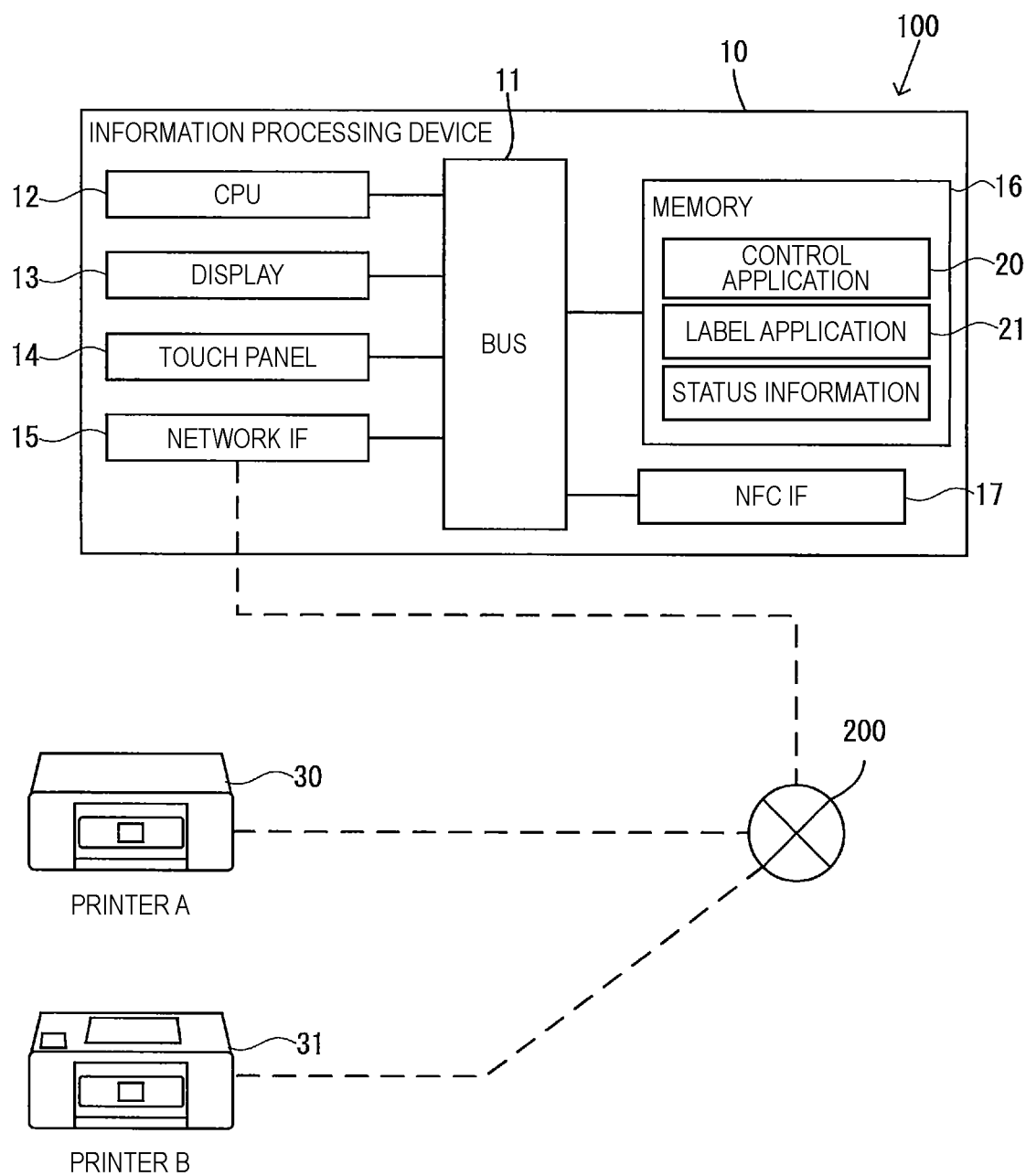
FIG. 1 is a configuration view of a printing system.

A printing system 100 shown in FIG. 1 includes an information processing device 10, and printers 30 and 31 that are examples of the image processing apparatus. The information processing device 10 and the printers 30 and 31 are connected to a network 200. In the present embodiment, the network 200 may be the Internet, a local area network (LAN) or a combination of the LAN and the Internet. Also, the network 200 may be configured by a wired network, a wireless network or a combination of the wired and wireless networks. Specifically, the information processing device 10 and the printers 30 and 31 are wirelessly connected to a router (not shown) configuring a part of the network.

Each of the printers 30 and 31 has, as a function thereof, print processing of printing an image by discharging ink to a sheet that is a medium to be printed. The printer 31 is a complex machine having, as functions, scan processing, copy processing and FAX processing, in addition to the print processing. The print processing is an example of the output function of outputting an image. The scan processing is a function of reading a document set on an ADF and is an example of the input function of. The copy processing is a function of outputting an image input by the scan processing by the print processing and is an example of the input and output function. Hereinbelow, a printer model of the printer 30 is referred to as "printer A", and a printer model of the printer 31 is referred to as "printer B".

The information processing device 10 is a PC, a smartphone or a tablet terminal. The information processing device 10 includes a bus 11, a Central Processing Unit (CPU) 12, a display 13, a touch panel 14, a network IF 15, a memory 16, and an NFC IF 17, which are configured to perform communication with each other via the bus 11.

The display 13 has a display screen for displaying a screen. The touch panel 14 includes a touch sensor, and is arranged to cover the display surface of the display 13. The touch panel 14 is configured to detect approach and contact of a user's finger, a touch pen and the like to the touch panel 14, and to output an electric signal, in response to the detection. Hereinbelow, an operation on the touch panel 14 by a user is also referred to as a user operation. In the present embodiment, the touch panel 14 corresponds to the operation unit. The information processing device 10 may include physical operation keys, as the operation unit.

The network IF 15 is configured to perform wireless communication such as Wi-Fi® (registered trademark), based on IEEE 802.11 standards and standards conforming thereto, for example. The NFC IF 17 can perform wireless communication, based on Near field communication (NFC) standards. For this reason, the information processing device 10 can perform wireless communication with the printers 30 and 31 via the network IF 15 or the NFC IF 17. In the meantime, the network IF 15 may also be configured to perform short-range wireless communication such as Bluetooth (registered trademark) with the printers 30 and 31. In the present embodiment, the network IF 15 and the NFC IF are examples of the communication unit.

The memory 16 is configured by a combination of a Random Access Memory (RAM), a Read Only Memory (ROM), and a flash memory, for example. Also, the memory 16 may be a computer readable storage medium. The computer readable storage medium includes a recording medium such as a CD-ROM, a DVD-ROM and the like.

In the memory 16, a control application 20 and a label application 21 are stored, in addition to a client-side Operating System (OS, not shown). The CPU 12 can perform communication with the printers 30 and 31 by executing a control application (hereinbelow, referred to as control AP 20) under execution of the client-side OS. In a data storage area of the memory 16, a variety of data that is referred when the CPU 12 executes the control AP 20 is stored. In the present embodiment, the control AP 20 is an example of the control program. In the meantime, the CPU 12 that executes the control AP 20 may be simply described by a program name. For example, the description "the control AP 20" may mean "the CPU 12 that executes the control AP 20".

The control AP 20 can execute the label application 21 (hereinbelow, referred to as the label AP) that is an example of the external program, thereby preparing a label image that is used in the print processing. Specifically, when a function of preparing a label image is selected, the control AP 20 activates the label AP 21. For example, the label image is an image that is printed on a recording medium such as a CD-ROM, a DVD-ROM or the like. When printing the prepared label image, the label AP 21 transfers the prepared label image to the control AP 20, and causes the control AP 20 to execute the print processing for the printers 30 and 31.

In the present embodiment, the processing of the CPU 12 that is executed in response to commands described in a program is mainly described. That is, in descriptions below, the processing such as "determining", "extracting", "selecting", "calculating", "specifying", "acquiring". "receiving", "controlling" and the like indicates the processing of the CPU 12. The processing that is executed by the CPU 12 includes hardware control via the client-side OS. In the meantime, "acquiring" is used as a concept that does not necessarily require a request. That is, processing of receiving data without a request by the CPU 12 is also included in the concept that "the CPU 12 acquires data". Also, "data" in the specification is indicated by a bit string that can be read into a computer. Data having the same substantial meaning and different formats is treated as the same data. The same applies to "information" in the specification.

The control AP 20 is configured to acquire status information from the printers 30 and 31. The status information is information indicative of states of the printers 30 and 31, settings of the printers 30 and 31, identification information of the printers 30 and 31, and a network setting. In the present embodiment, status information described below exists in relation to each function of the printer 31. Specifically, as the status information relevant to the print processing (hereinbelow, referred to as first status information), "Error: No sheet", "Error: Ink shortage". "Sheet size", "Error: Sheet jammed", "Error: Cover opened", and "Print busy" are provided. As the status information relevant to the scan processing (hereinbelow, referred to as second status information), "Error: No document set", "Error: Cover opened", "Continuous scan mode", and "Scan busy" are provided. As the status information relevant to the FAX processing (hereinbelow, referred to as third status information), "Error: Remaining receiving memory capacity is insufficient", "the number of receptions", and "Telephone line connection error" are provided. The first status information and the second status information are also status information relevant to the copy function. The first, second and third status information may include common status information.

In a state where communication connection is not established between the information processing device 10 and the printer or communication cannot be performed therebetween, statuses of the printers 30 and 31 are offline. Also, in a case where the printers 30 and 31 are printers capable of performing printing on a disk such as a CD, "Error: No disk" is included in the first status information. In a case where the printers 30 and 31 use batteries such as storage batteries as electric power, "Battery error" is included in the first to third status information.

Subsequently, a screen that is displayed on the display 13 is described with reference to FIGS. 2 to 5 by taking, as an example, a case where communication connection is established between the information processing device 10 and the printer 31. The control AP 20 displays displayable information of statuses of the printer 31 in a top screen. In a function execution screen that is displayed as each function is selected by the user, the control AP 20 displays displayable information of the status corresponding to the selected function by a badge image.

Figure 2:
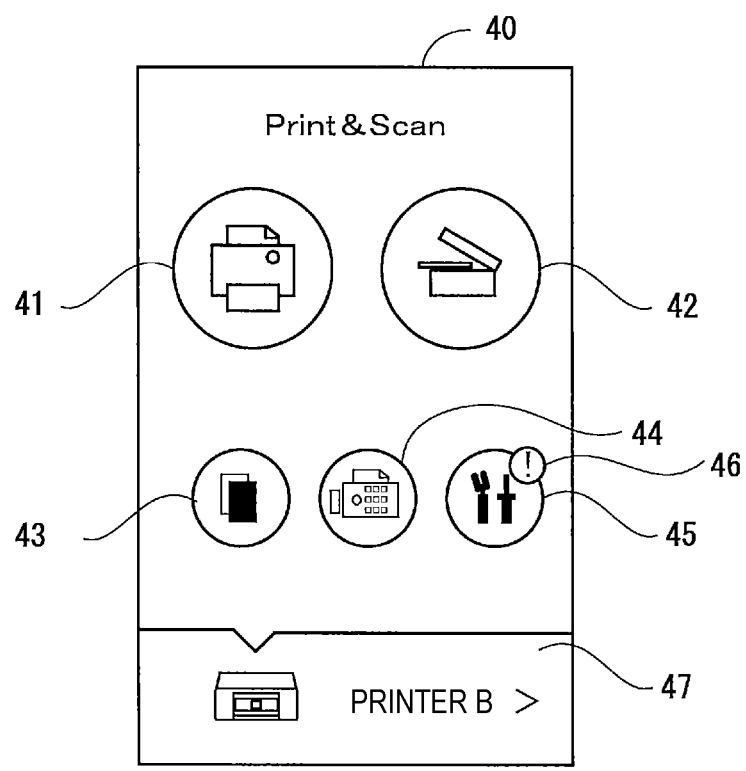
FIG. 2 depicts a top screen.

Specifically, the control AP 20 displays a top screen 40 shown in FIG. 2 on the display 13. In the present embodiment, the top screen 40 is an example of the function selection screen, and includes a print icon 41, a scan icon 42, a copy icon 43, a FAX icon 44, a status icon 45 and a printer display area 47. The print icon 41 is an icon that is operated when the user selects the print processing as the function of the printer 31. The scan icon 42 is an icon that is operated when the user selects the scan processing as the function of the printer 31. The copy icon 43 is an icon that is operated when the user selects the copy processing as the function of the printer 31. The FAX icon 44 is an icon that is operated when the user selects the FAX processing as the function of the printer 31. The status icon 45 is an icon that is operated when the user selects a display of a status screen for displaying a status of the printer 31. Although described in detail later, when status information indicative of a warning or an error is acquired from the printer 31, the control AP 20 displays a badge image 46 indicative of a warning or an error in the vicinity of the status icon 45. In the printer display area 47, a printer model of a printer connected to the information processing device 10 is displayed. In FIG. 2, a printer B that is a printer model of the printer 31 is displayed. The control AP 20 can perform selection processing of selecting a printer, in response to a user operation on the printer display area 47. In the selection processing, for example, printers capable of performing communication with the information processing device 10 via the network 200 are searched, and a printer is selected, in response to a user operation of selecting one of the searched printers.

Figure 3:
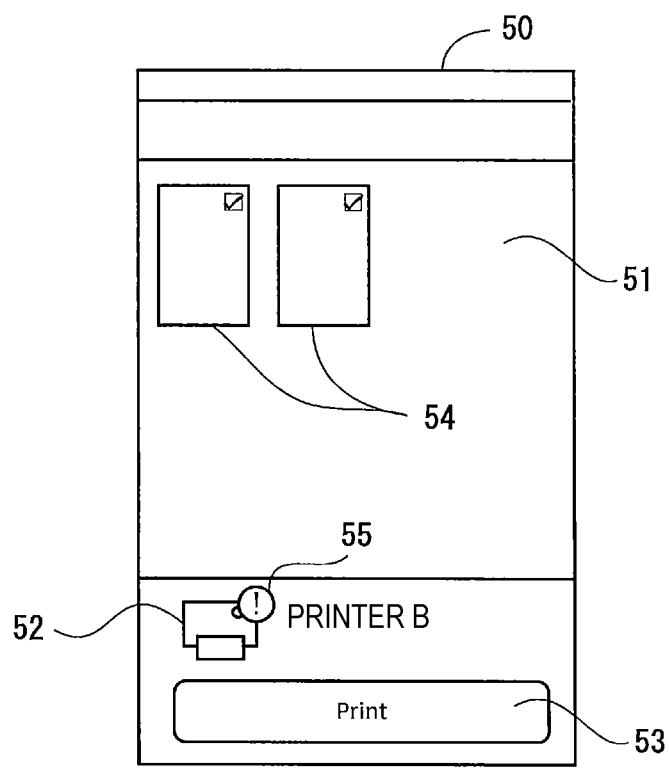
FIG. 3 depicts a function execution screen in print processing.

When the print icon 41 is selected on the top screen 40 by the user operation, the control AP 20 shifts the screen displayed on the display 13 to a screen relevant to the print processing. FIG. 3 depicts a first function execution screen 50 for print processing, which is an example of the screen relevant to the print processing. The first function execution screen 50 includes a display area 51, a device icon 52, a printing execution button 53, and a badge image 55.

In the display area 51, objects that are targets of the print processing are displayed. In FIG. 3, two objects 54 that are targets of the print processing are displayed in the display area 51, as an example. The printing execution button 53 is a button for receiving an execution instruction of the print processing for the printer 31 by the user operation. The device icon 52 is an icon that graphically displays the printer 31 relevant to the print processing. In the meantime, when the status information indicative of a warning or an error is acquired from the printer 31, the badge image 55 indicative of a warning or an error is displayed in the vicinity of the device icon 52. The badge image 55 will be described in detail later.

When the printing execution button 53 is selected by the user operation, the control AP 20 transmits a printing instruction to print the objects 54 to the printer 31. Specifically, the control AP 20 generates a printing job corresponding to an object, which is selected by the user operation, of the objects displayed in the display area 51, and transmits the printing job to the printer 31. Also, in a state where the first function execution screen 50 is displayed on the display 13, the control AP 20 can execute setting processing of changing a setting of the print processing, in response to the user operation. The control AP 20 can change a color setting, a sheet size and the like in the print processing by the setting processing.

Figure 4:
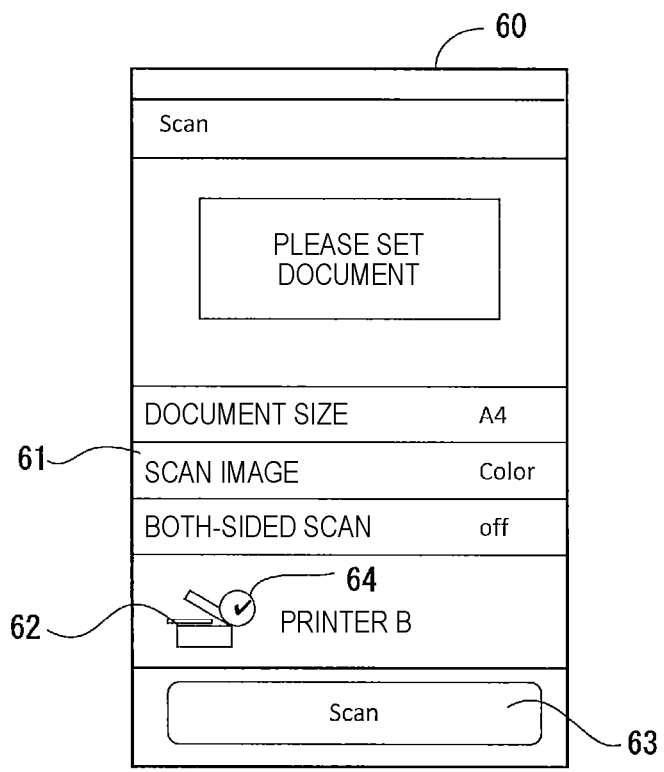
FIG. 4 depicts a function execution screen in scan processing.

Also, when the scan icon 42 is operated on the top screen 40 by the user operation, the control AP 20 shifts the screen displayed on the display 13 to a screen associated with the scan processing. FIG. 4 is a second function execution screen 60 for scan processing, which is an example of the screen associated with the scan processing. The second function execution screen 60 includes a setting area 61 for checking/changing a setting of the scan processing, a device icon 62, a reading execution button 63 and a badge image 64. The setting area 61 shown in FIG. 4 includes a field in which a document size can be set, a field in which a color of a scan image (color or monochrome) can be set, and a field in which it is possible to set whether to execute both-sided scan of scanning both sides of a document, as examples of a setting content of the scan processing. The control AP 20 can execute setting processing of changing a setting of the scan processing, in response to a user operation on the setting area 61. The reading execution button 63 is a button for receiving an execution instruction of the scan processing to the printer 31 by the user operation. The badge image 64 simply displays a status of the printer 31 relevant to the scan processing. The badge image 64 will be described in detail later.

When the reading execution button 63 is selected by the user operation, the control AP 20 transmits a reading instruction to execute the scan processing to the printer 31. Specifically, the control AP 20 generates a reading job including a setting of the scan processing displayed in the setting area 61, and transmits the reading job to the printer 31.

When the status icon 45 is operated on the top screen 40 by the user operation or when the device icon 52 on the first function execution screen 50 or the device icon 62 on the second function execution screen 60 is operated, the control AP 20 shifts the screen displayed on the display 13 to a status screen. The status screen is a screen for displaying a displayable status of statuses of the printer 31. A status screen 70 shown in FIG. 5 includes an error display field 71, an ink remaining amount display area 72, an IP address display area 73, a serial number display area 74, a firm information display area 75, and a remaining memory capacity display area 76.

Figure 5:
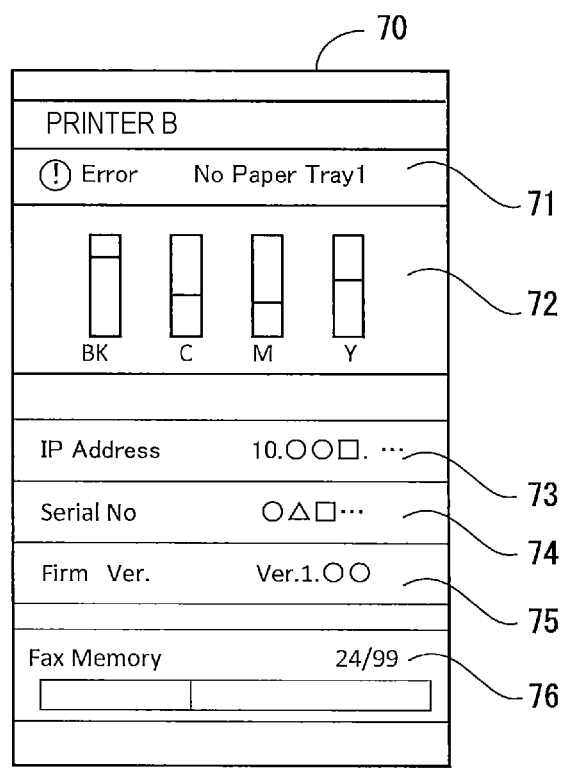
FIG. 5 depicts a status screen.

The error display field 71 is a field for displaying that there is an abnormality or a warning in the status of the printer 31. For example, when the control AP 20 acquires status information of an abnormality or a warning of the first to third status information, the control AP 20 displays a text of an abnormality or a warning in the error display field 71, based on the status information. In the example of FIG. 5, an error indicating that no sheet is set in a sheet feeding tray of the printer 31 is displayed.

The ink remaining amount display area 72 is an area for displaying a remaining amount of an ink cartridge of each color of the printer 31. The control AP 20 changes a display manner of the ink remaining amount display area 72, based on the "ink remaining amount" of the first status information. In the present embodiment, since the printer 31 has cartridges of four colors of cyan (C) magenta (M) yellow (Y) and black (BK) remaining amounts of each color of cyan (C), magenta (M), yellow (Y) and black (BK) are displayed in the ink remaining amount display area 72.

The IP address display area 73 is an area for displaying an IP address of the printer 31. The serial number display area 74 is an area for displaying a serial number of the printer 31. The firm information display area 75 is an area for displaying a firmware version of the printer 31. The remaining memory capacity display area 76 is an area for displaying a remaining capacity of a memory of the printer 31 in which received data is stored by the FAX processing. The control AP 20 changes a display manner of the remaining memory capacity display area 76, based on the "remaining reception memory capacity" of the third status information.

In addition to the information shown in FIG. 5, the status screen 70 includes a reception number display area indicating the number of receptions in the FAX processing. The control AP 20 changes a display manner of the reception number display area, based on the "reception number" of the third status information.

Subsequently, the badge images that are displayed in the top screen and each function execution screen are described with reference to FIG. 6. FIG. 6 depicts the badge images for each of the statuses (normal, error and offline) of the printer in the top screen 40 and the first and second function execution screens 50 and 60. In the meantime, since the badge images that are displayed in the function execution screen in the copy processing and the FAX processing are similar to the badge images in the first and second function execution screens 50 and 60, the descriptions thereof are omitted.

First, a display state of the badge image 46 in the top screen 40 is described. When the status of each function of the printer is normal, the control AP 20 hides the badge image 46 in the top screen 40. When the status of each function of the printer is an error state, the control AP 20 displays the badge image 46 indicative of an error state in the vicinity of the status icon 45 in the top screen 40. When the information processing device 10 and the printer are offline, the control AP 20 displays the badge image 46 indicative of an offline in the vicinity of the status icon 45 in the top screen 40. For example, when "Error. No sheet" is acquired as the status information from the printer, the control AP 20 displays the badge image 46 of an exclamation mark in the vicinity of the status icon 45 (FIG. 2).

Subsequently, a display manner of the badge image that is displayed in the function execution screen is described. The control AP 20 changes the badge image on the function execution screen, which is displayed as any one of the icons 41 to 44 is operated on the top screen 40, in accordance with a status relevant to the selected function of the printer. Specifically, when the first function execution screen 50 is displayed and the status relevant to the print processing is normal, the control AP 20 displays the badge image 55, which indicates that the status of the print processing is normal, in the vicinity of the device icon 52. When the first function execution screen 50 is displayed and the status relevant to the print processing is an error state, the control AP 20 displays the badge image 55, which indicates that the status of the print processing is abnormal, in the vicinity of the device icon 52. For example, when "Error: No sheet" is acquired as the status information from the printer, the control AP 20 displays the badge image 55 of an exclamation mark in the vicinity of the device icon 52 (FIG. 3). When the first function execution screen 50 is displayed and the information processing device 10 and the printer are offline, the control AP 20 displays the badge image 55 indicative of an offline in the vicinity of the device icon 52.

When the second function execution screen 60 is displayed and the status relevant to the scan processing is normal, the control AP 20 displays the badge image 64, which indicates that the status of the scan processing is normal, in the vicinity of the device icon 62. When the second function execution screen 60 is displayed and the status relevant to the scan processing is an error state, the control AP 20 displays the badge image 64, which indicates that the status of the scan processing is abnormal, in the vicinity of the device icon 62. For example, when "Error: No sheet" is acquired as the status information from the printer, "Error: No sheet" is irrelevant to the scan processing. For this reason, the control AP 20 displays the badge image 64 of a check mark, which indicates that the status is normal, in the vicinity of the device icon 62 (FIG. 4). When the second function execution screen 60 is displayed and the information processing device 10 and the printer are offline, the control AP 20 displays the badge image 64 indicative of an offline in the vicinity of the device icon 62.

In the present embodiment, the badge images that indicate an error state of each function in the top screen 40 and the first and second function execution screens 50 and 60 are the same form, and the badge images indicative of an offline are also the same form.

Figure 7:
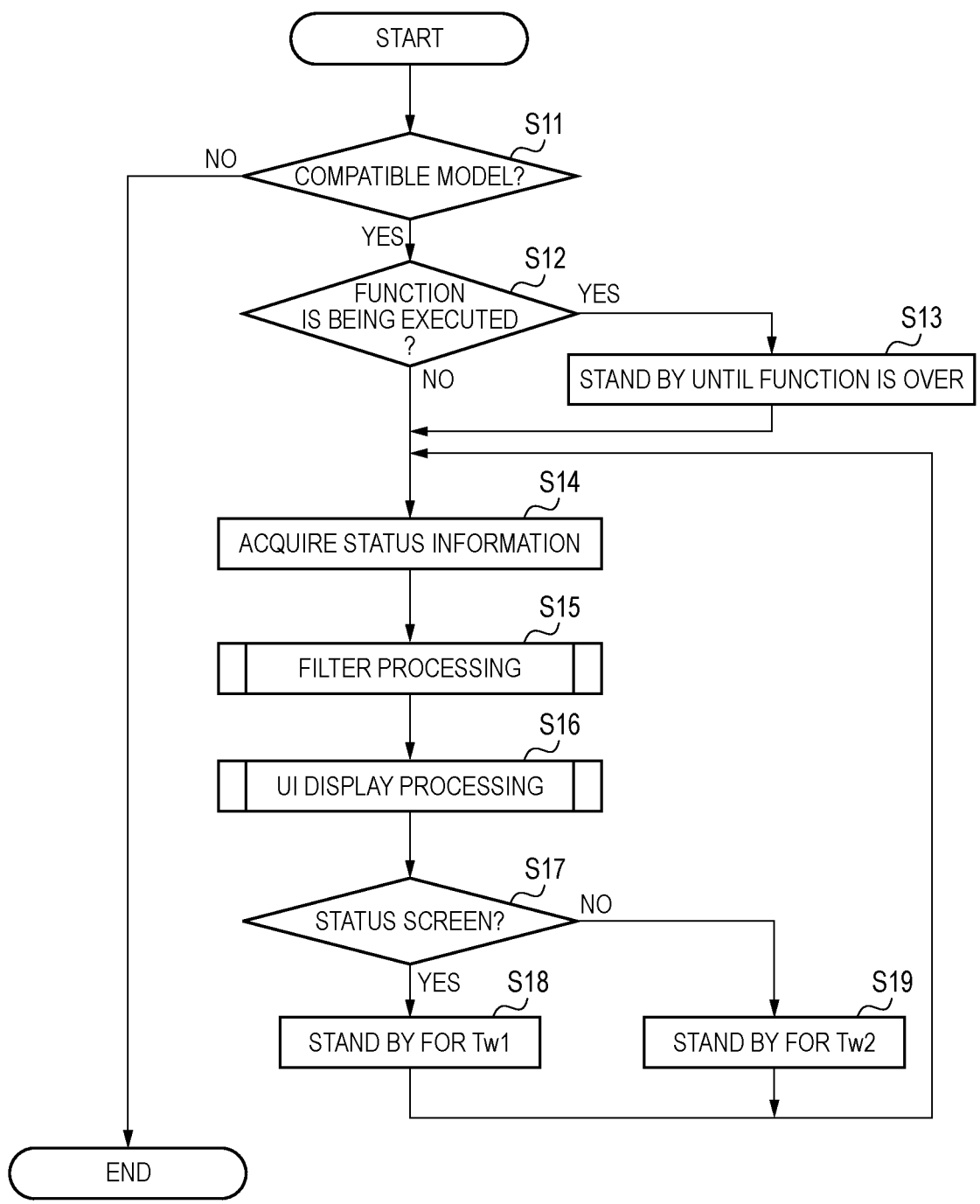
FIG. 7 is a flowchart depicting a sequence of processing that is executed by a CPU in accordance with a first embodiment.

Subsequently, a sequence of displaying the status of the printer 31 on the display 13 is described with reference to FIG. 7. The processing shown in FIG. 7 is executed when the printer connected to the information processing device 10 is selected. Also, in a case where the printer has been already selected, the present processing may be executed when the control AP 20 is activated. In the meantime, since the present processing is processing that is executed by the CPU 12 (control AP 20), the subject of the present processing is omitted.

In step S11, it is determined whether the printer connected to the information processing device 10 is a compatible model whose status can be acquired. Specifically, information of a printer model is acquired from the connected printer and it is determined whether the acquired information of the printer model is included in the information of the compatible model provided in the control AP 20. When the printer is not a compatible model, the processing of FIG. 7 is once ended. In the present embodiment, it is determined that the printer 31 is a compatible model whose status can be acquired, and the processing proceeds to step S12.

In step S12, it is determined whether the printer 31 is executing each function of the print processing, the scan processing, the copy processing, and the FAX processing. Specifically, when the information relevant to each function is transmitted and received, such as transmitting the printing instruction or the reading instruction to the printer 31, receiving scan data from the printer 31 having executed the scan processing, and the like, it is determined that each function is being executed. When the printer 31 is executing each function, the processing proceeds to step S13, and stands by until the function being executed is over. Then, the processing proceeds to step S14. On the other hand, when it is determined in step S12 that the printer 31 is not executing each function, the processing proceeds to step S14.

In step S14, the status information is acquired from the printer 31 via communication. The status information acquired in step S14 is all the status information that can be acquired from the printer 31.

In step S15, filter processing of extracting status information, which is relevant to the currently selected function, of the status information acquired in step S14 is executed. For example, in the memory 16, a table in which a correspondence relation between the print processing, scan processing, copy processing, and FAX processing and each status information is defined is stored. By referring to the table, the status information is extracted in step S15. The filter processing will be described in detail later.

In step S16, UI display processing of displaying the status of the printer 31 by using the status information extracted in step S15 is executed. The UI display processing will be described in detail later.

In step S17, it is determined whether the status screen 70 is currently being displayed on the display 13. When it is determined that the status screen 70 is being displayed on the display 13, the processing proceeds to step S18. In step S18, after standing by for a first period Tw1, the processing returns to step S14 and the status information is again acquired. On the other hand, when it is determined that the status screen 70 is not displayed the display 13, the processing proceeds to step S19. In step S19, after standing by for a second period Tw2 longer than the first period Tw1, the processing returns to step S14 and the status information is again acquired. Thereby, a status information acquisition period (Tw1) when the status screen 70 is displayed on the display 13 is shorter than a status information acquisition period (Tw2) when the status screen 70 is not displayed on the display 13. This is to reduce a time lag of information to be displayed as much as possible because the status screen 70 is a screen for specifically indicating the status of the printer 31.

Subsequently, the filter processing in step S15 is described in detail with reference to FIG. 8. In the filter processing, the status information, which is relevant to a function currently selected as the function of the printer 31, of the status information acquired in step S14 is extracted.

In step S21, it is determined whether the printer 31 is offline. For example, when communication connection with the printer 31 is not established, a determination result in step S21 is affirmative, and the processing proceeds to step S22. In step S22, offline is returned as the status of the printer 31. On the other hand, when a determination result in step S21 is negative, the processing proceeds to step S23.

In step S23, it is determined whether the display of the status screen 70 is currently selected. When it is determined that the display of the status screen 70 is selected, the processing proceeds to step S24. In step S24, all the status information acquired in step S14 is returned. When a determination result in step S23 is negative, the processing proceeds to step S25.

In step S25, it is determined whether the print processing is currently selected as the function of the printer 31. When it is determined that the print processing is selected, the processing proceeds to step S26, and print filter processing of extracting the first status information from all the status information acquired in step S14 is executed. On the other hand, when a determination result in step S25 is negative, the processing proceeds to step S27.

In step S27, it is determined whether the scan processing is currently selected as the function of the printer 31. When it is determined that the scan processing is selected, the processing proceeds to step S28, and scan filter processing of extracting the second status information from all the status information acquired in step S14 is executed. On the other hand, when a determination result in step S27 is negative, the processing proceeds to step S29.

In step S29, it is determined whether the copy processing is currently selected as the function of the printer 31. When it is determined that the copy processing is selected, the processing proceeds to step S30, and copy filter processing of extracting the first status information and the second status information from all the status information acquired in step S14 is executed. On the other hand, when a determination result in step S29 is negative, the processing proceeds to step S31.

In step S31, it is determined whether the FAX processing is currently selected as the function of the printer 31. When it is determined that the FAX processing is selected, the processing proceeds to step S32. In step S32, the third status information is extracted from all the status information acquired in step S14. On the other hand, when a determination result in step S31 is negative, the processing proceeds to step S24, and all the status information acquired in step S14 is returned. When the processing of steps S22, S24, S26, S28, S30 and S32 is executed, the filter processing is over.

Figure 8:
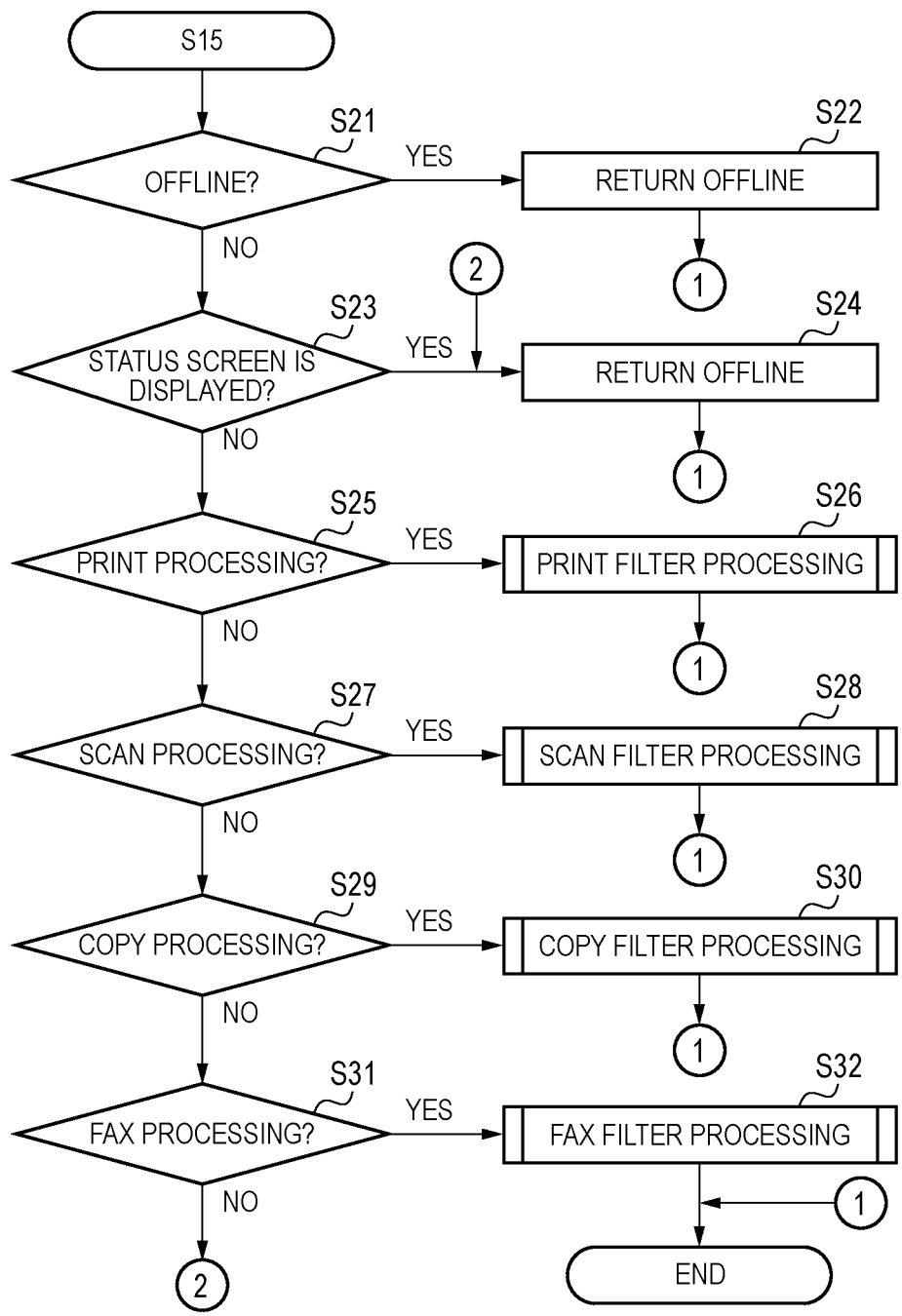
FIG. 8 is a flowchart depicting a sequence of filter processing that is executed in step S15 of FIG. 7.
Figure 9:
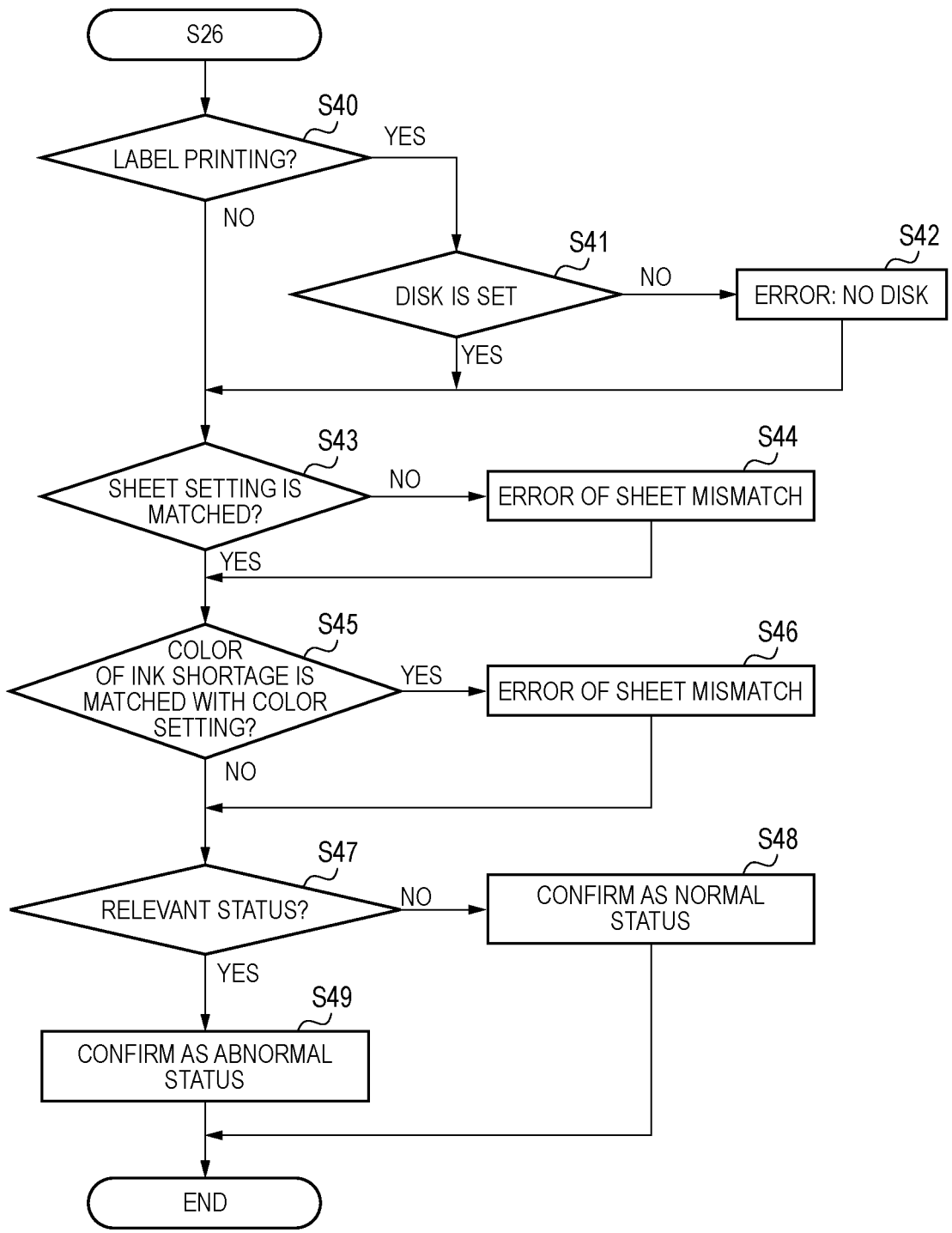
FIG. 9 is a flowchart depicting a sequence of print filter processing that is executed in step S26 of FIG. 8.

Subsequently, the print filter processing that is executed in step S26 of FIG. 8 is described with reference to FIG. 9. In step S40, the label AP 21 is executed to determine whether label printing is selected. As described above, the label AP 21 has a function of transferring a prepared label image to the control AP 20. When the label image is received from the label AP 21, it is determined in step S40 that label printing is selected. When the label printing is selected, the processing proceeds to step S41 to determine whether "Error: No disk" is included in the status information. When it is determined that "Error: No disk" is included in the status information and the disk setting is not completed, the processing proceeds to step S42 to return "Error: No disk" as the status of the printer 31. When it is determined in step S40 that the label printing is not selected, when it is determined in step S41 that "Error: No disk" is not included and the disk is set or after step S42, the processing proceeds to step S43.

In step S43, it is determined whether the sheet setting is matched by using the status information. Specifically, when it is determined that "Sheet size" of the status information is not matched with a sheet size set in the setting processing of the control AP 20, the processing proceeds to step S44, and an error of sheet mismatch is returned as the status of the printer 31. On the other hand, when it is determined in step S43 that the sheet setting is matched or after step S44, the processing proceeds to step S45.

In step S45, it is determined whether "Error: Ink shortage" is included in the status information and a color having "Error: Ink shortage" is matched with a color setting (color, monochrome) set in the setting processing of the control AP 20. When it is determined that a color having "Error: Ink shortage" is matched with a setting of a color set in the color setting, i.e., a color having "Error: Ink shortage" is any one of cyan (C), magenta (M) and yellow (Y) and the color setting is color, the processing proceeds to step S46 to return "Error: Ink shortage" as the status of the printer 31. On the other hand, when it is determined in step S45 that a color having "Error: Ink shortage" is not matched with a color set in the color setting or after step S46, the processing proceeds to step S47.

In step S47, it is determined whether there is a status relevant to the current setting of the print processing in the status information, in addition to the status returned in any one of steps S42, S44 and S46. In the present embodiment, when any one status information of "Error: No sheet". "Error: Sheet jammed", "Error: Cover opened", and "Print busy" is acquired, a determination result in step S47 is affirmative, and when no status information is acquired, a determination result is negative. When a determination result in step S47 is negative, the processing proceeds to step S48 to confirm that the status of the printer 31 is normal. On the other hand, when a determination result in step S47 is affirmative, the processing proceeds to step S49 to confirm that the status of the printer 31 is abnormal.

Figure 10:
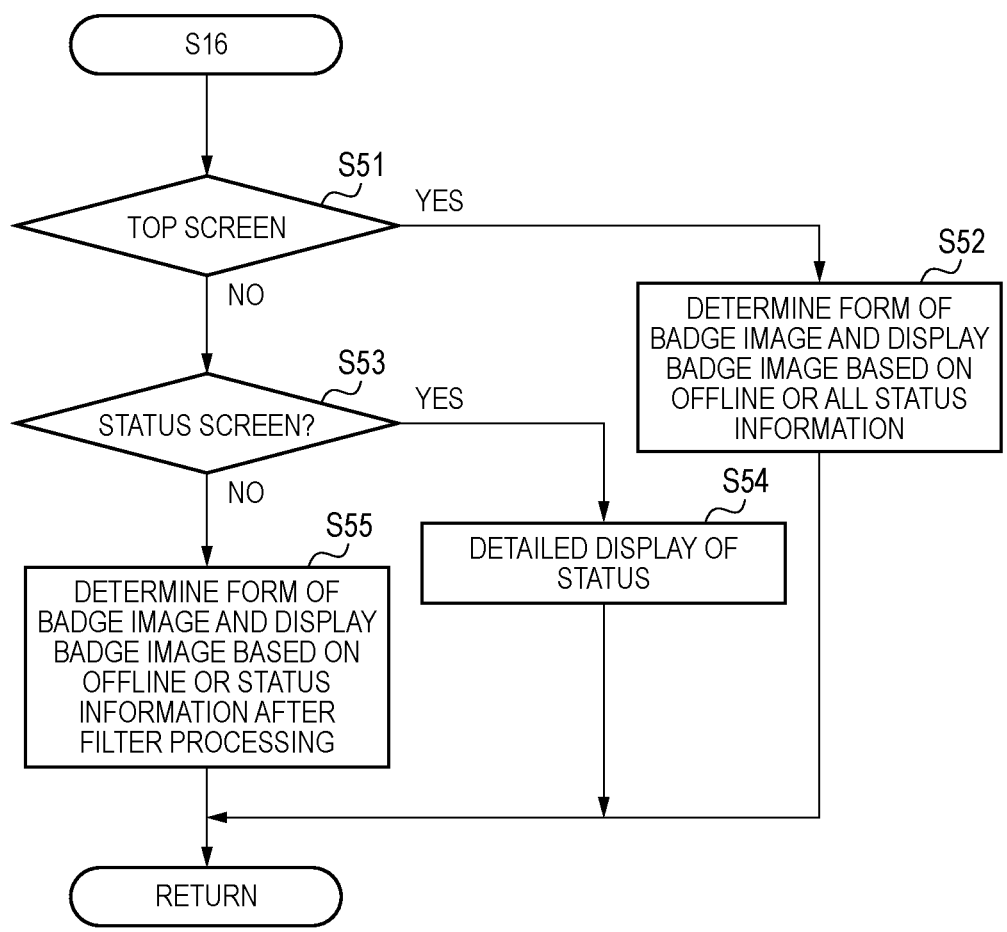
FIG. 10 is a flowchart depicting a sequence of UI display processing that is executed in step S16 of FIG. 7.

Next, the displaying of the badge image is described. FIG. 10 is a flowchart depicting a detailed sequence of the UI display processing that is executed in step S16 of FIG. 7.

In step S51, it is determined whether to display the top screen 40. When it is determined to display the top screen 40 on the display 13, the processing proceeds to step S52 to determine a form of the badge image 46, based on the offline returned in S22 or all the status information returned in S24, and to display the badge image, based on the determined form. Specifically, when the offline is returned in S22, the badge image 46 indicative of an offline is determined. Also, in a case where the offline is not returned, an exclamation mark is determined as the badge image 46 when the status information indicative of a warning or an error is acquired and the badge image 46 is determined to be not displayed when the status information indicative of a warning or an error is not acquired, in all the status information returned in S24.

When a determination result in step S51 is negative, the processing proceeds to step S53 to determine whether to display the status screen 70. When it is determined to display the status screen 70, the processing proceeds to step S54 to display the status screen 70 (FIG. 5) by using the offline returned in S22 or all the status information returned in step S24. As shown in FIG. 5, in the status screen 70, all the statuses that can be displayed by the control AP 20 are displayed using the status information acquired from the printer 31. On the other hand, when the offline is returned in S22, a message indicative of an offline is displayed in the error display field 71 and each of the fields 72 to 76 is not displayed or grayed out.

When it is not determined in step S53 to display the status screen 70, i.e., it is determined to display the function execution screen, the processing proceeds to step S55. In step S55, the status of the printer 31 is displayed using the offline returned in S22 or the status information after the filter processing corresponding to the currently selected function of the printer 31. In step S55, when the status is normal, the badge image that is displayed in the function execution screen has a form that indicates a normal status, such as a check mark. On the other hand, when the status is abnormal, the badge image has a form that indicates an abnormal status, such as an exclamation mark. Also, as described above, in a case where the color setting is monochrome, even when the remaining amounts of inks of cyan (C), magenta (M) and yellow (Y) are insufficient, the badge image indicative of the abnormal status, which corresponds to the ink shortage, as the status is not displayed.

When the device icon displayed in the function execution screen is operated by the user operation, the CPU 12 determines affirmative in step S53 (step S53: YES), and displays the status screen 70 (FIG. 5) on the display 13 in step S54. Thereby, while suppressing usability of the information processing device 10 from being lowered, it is possible to cope with a situation where the user wants to check the details of the status of the printer.

Figure 11:
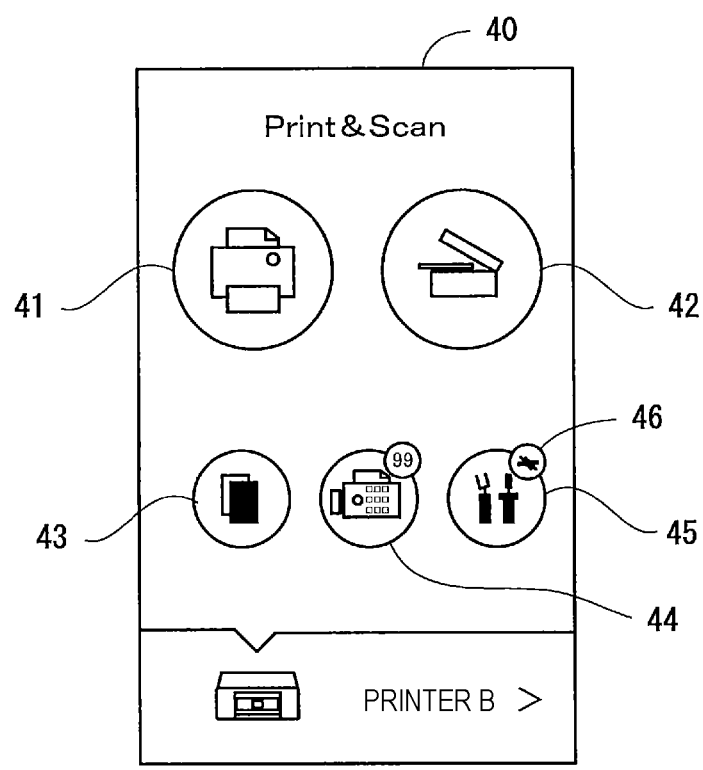
FIG. 11 illustrates a status that is displayed on the top screen.

FIG. 11 depicts the top screen 40 that is displayed in step S52. In the example of FIG. 11, since the information processing device 10 and the printer are offline, the badge image 46 indicative of offline is displayed in the vicinity of the status icon 45. On the other hand, "99" indicative of the number of FAX receptions is displayed in the FAX icon 44.

Figure 12:
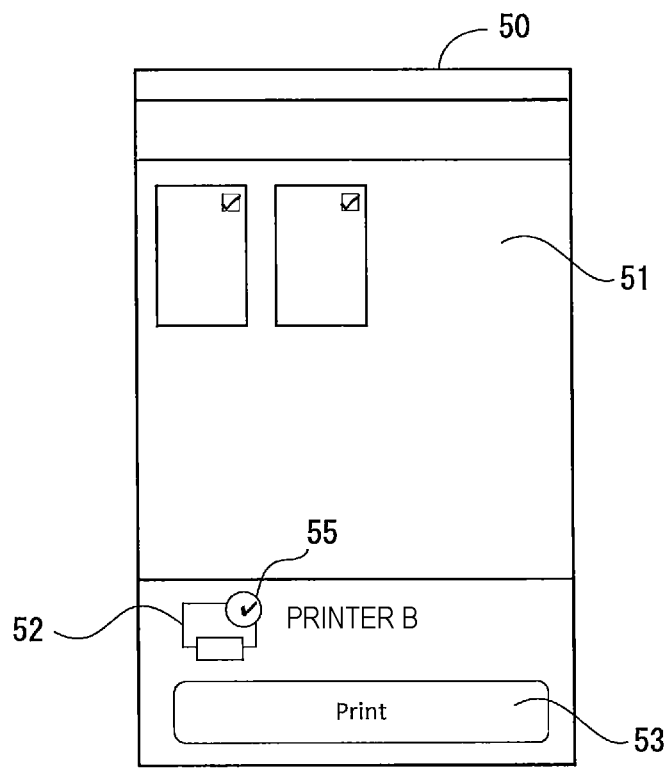
FIG. 12 illustrates a status that is displayed on the function execution screen.

FIG. 12 depicts the first function execution screen 50 that is displayed in step S55, as an example. In FIG. 12, the badge image 55 has a form indicating that the status relevant to the print processing is normal. In the first function execution screen 50, the badge image indicative of an error is not displayed even when the status relevant to the FAX processing is an error That is, the status of the function that is not selected is not displayed, so that the display of the status is limited.

When the status icon 45 is operated in FIG. 11 or when the device icon 52 is operated in FIG. 12, the CPU 12 displays the status screen (FIG. 5).

In the present embodiment, step S14 is an example of the acquiring of the status information. Steps S23, S25, S27, S29 and S31 are examples of the determining of which function of functions of the image processing apparatus is selected. Step S52 is an example of the first display processing. Step S55 is an example of the second display processing.

<Scan Filter Processing>

Figure 13:
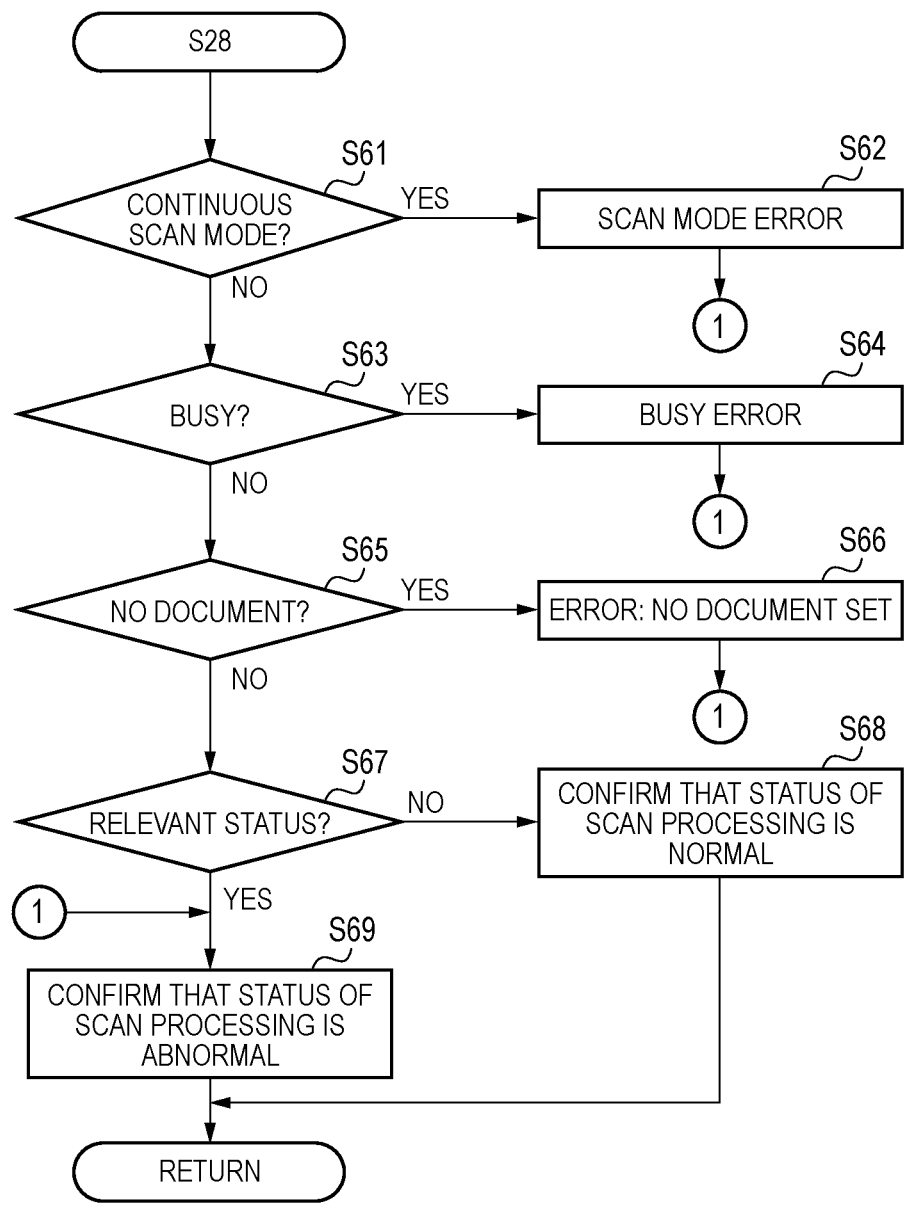
FIG. 13 is a flowchart depicting a sequence of scan filter processing that is executed in step S28 of FIG. 8.

Subsequently, a sequence of the scan filter processing that is executed in step S28 of FIG. 8 is described with reference to FIG. 13.

In step S61, it is determined whether the scan processing is a continuous scan mode, based on whether "Continuous scan mode" is included in the acquired status information. When it is determined that the scan processing is a continuous scan mode, the processing proceeds to step S62, and a scan mode error is returned as the status of the printer 31. When it is determined in step S61 that the scan processing is not a continuous scan mode, the processing proceeds to step S63.

In step S63, it is determined whether the printer 31 is in a scan busy state, based on whether "Scan busy" is included in the acquired status information. When it is determined that the printer 31 is not in a scan busy state, the processing proceeds to step S65. On the other hand, when it is determined that the printer 31 is in a scan busy state, the processing proceeds to step S64, and a busy error is returned as the status of the printer 31.

In step S65, it is determined whether a document is set on the ADF, based on whether "Error: No document set" is included in the acquired status information. When it is determined that a document is set on the ADF, the processing proceeds to step S67. On the other hand, when it is determined that a document is not set on the ADF, the processing proceeds to step S68, and "Error: No document set" is returned as the status of the printer 31.

In step S67, it is determined whether there is a status relevant to the current setting of the scan processing in the status information, in addition to the status returned in any one of steps S62, S64 and S66. When a determination result in step S67 is negative, the processing proceeds to step S68, and it is determined that the status of the scan processing is normal. On the other hand, when a determination result in step S67 is affirmative, the processing proceeds to step S69, and it is determined that the status of the scan processing is abnormal.

By the determination in steps S68 and S69, the form of the badge image in the second function execution screen 60 is changed in steps S52 and S55 of FIG. 10.

<Copy Filter Processing>

Figure 14:
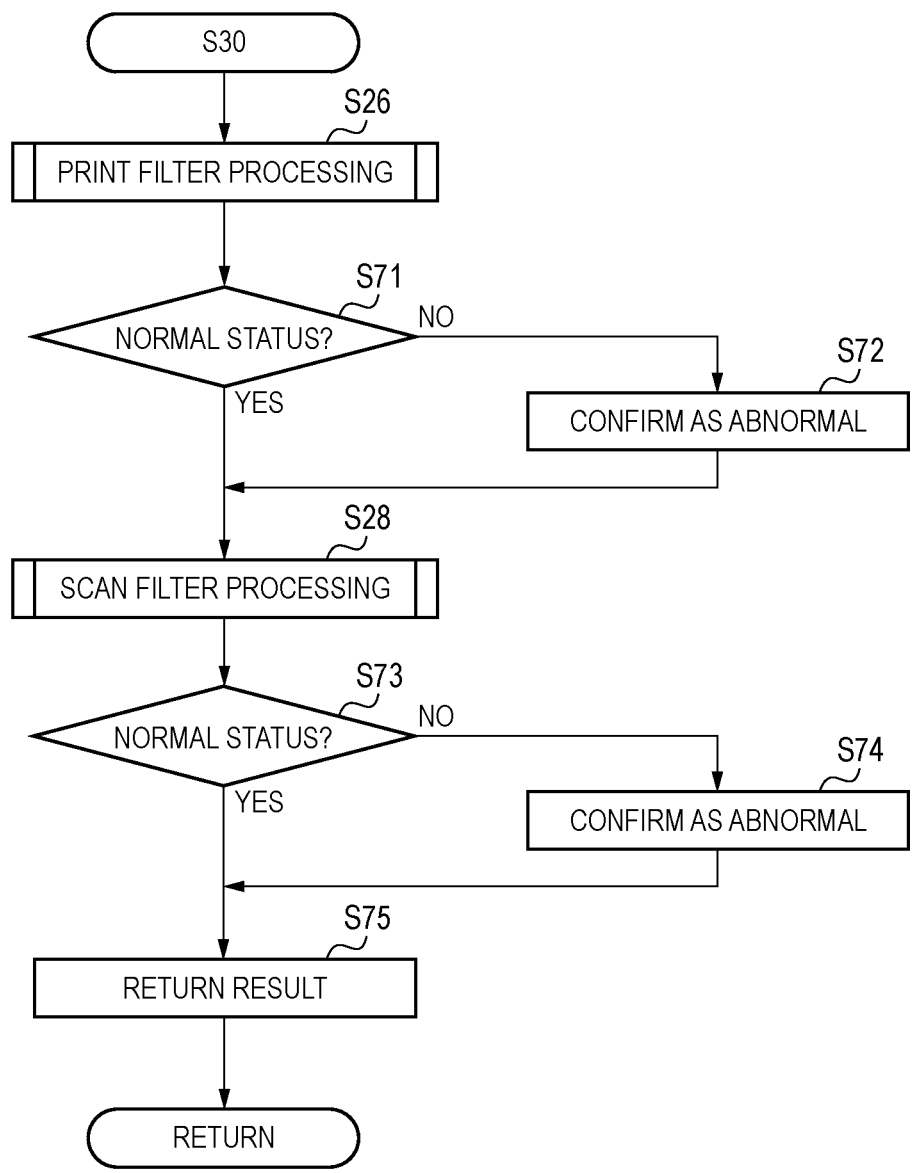
FIG. 14 is a flowchart depicting a sequence of copy filter processing that is executed in step S30 of FIG. 8.

Subsequently, a sequence of the copy filter processing that is executed in step S30 of FIG. 8 is described with reference to FIG. 14. In the copy filter processing, the first status information relevant to the print processing and the second status information relevant to the scan processing are each subjected to the filter processing.

In step S26, the first status information of the status information acquired in step S14 is extracted by the print filter processing. In step S71, it is determined whether the status of the print processing is normal by using the first status information extracted in step S26. When a determination result in step S71 is affirmative, the processing proceeds to step S28. On the other hand, when a determination result in step S71 is negative, the processing proceeds to step S72 to confirm that the status of the print processing of the copy processing is abnormal.

In step S28, the second status information of the status information acquired in step S14 is extracted by the scan filter processing. In step S73, it is determined whether the status of the scan processing is normal by using the second status information extracted in step S28. When a determination result in step S73 is affirmative, the processing proceeds to step S75. On the other hand, when a determination result in step S73 is negative, the processing proceeds to step S74 to confirm that the status of the scan processing of the copy processing is abnormal.

In step S75, the status of the entire copy processing is confirmed. Specifically, when it is confirmed in step S72 that the status of the copy processing is abnormal, when it is confirmed in step S74 that the status of the scan processing is abnormal, or when it is confirmed in step S72 that the status of the copy processing is abnormal and it is confirmed in step S74 that the status of the scan processing is abnormal, it is confirmed that the status of the copy processing is abnormal. On the other hand, when it is determined that statuses of the print processing and the copy processing are both normal, it is determined that the status of the copy processing is normal. Then, the processing of FIG. 14 is once ended.

In the first embodiment as described above, it is possible to achieve the following effects. In a case where it is determined that none of the plurality of functions of the printer is selected on the top screen 40, the CPU 12 of the information processing device 10 displays the statuses of the printer as the badge images on the top screen 40 based on the status information which is included in the acquired status information and is relevant to all the functions. On the other hand, in a case where it is determined that any one of the plurality of functions of the printer is selected on the top screen 40, the CPU 12 displays the badge image indicative of the status of the printer on the display 13 based on the status information which is included in the acquired status information and is relevant to the selected function, and does not display the status by the badge image based on the status information which is included in the acquired status information and is relevant to the functions that are not selected. Thereby, in a state where the function of the printer is not selected, the user can check the statuses about all the functions of the printer. On the other hand, in a state where the function of the printer is selected, the user can operate the information processing device 10 while checking the badge image relevant to the selected function. Therefore, it is possible to suppress the usability of the information processing device 10 from being lowered.

When the copy processing is selected as the function of the printer, the CPU 12 determines a form of the badge image based on the second status information included in the acquired status information and relevant to the scan processing and the first status information included in the acquired status information and relevant to the print processing, and displays the badge image on the display 13. Thereby, when the function in which the scan processing and the print processing are combined is selected by the user, the status information relevant to each function is selected and the badge image is displayed on the display 13.

The CPU 12 executes the setting processing of performing setting to the selected function based on the operation received by the touch panel 14. The CPU 12 changes the form of the badge image that is displayed on the display 13 in accordance with the setting in the setting processing. Thereby, since it is possible to display more favorably the status of the printer in accordance with the selected function, it is possible to further suppress the usability of the information processing device 10 from being lowered.

In a case where the CPU 12 activates the control AP 20 in response to the instruction of the label AP 21, the status corresponding to the function selected by the label AP 21 is displayed by the badge image. Thereby, even when the function of the printer is selected by execution of another program different from the control AP 20, the status relevant to the function selected by another program can be displayed. As a result, it is possible to further suppress the usability of the information processing device 10 for the user from being lowered.

The CPU 12 displays the statuses relevant to all the functions on the top screen 40, as the badge images. Thereby, the user can decide the function to be selected after checking the statuses of all the functions of the printer. Thereafter, when the user selects the function of the printer, only the status relevant to the selected function is displayed in the function execution screen by the badge image. Thereby, after checking only the status of the selected function, it is possible to decide whether to push an execution button of the selected function.

The CPU 12 displays, as the badge images, the statuses of the printer of all the functions that can be selected on the top screen 40, and displays the status corresponding to the function selected on the function execution screen by the badge image. The CPU 12 displays the status screen 70 on the display 13 when the device icon is operated by the user operation. Thereby, while suppressing usability of the information processing device 10 from being lowered, it is possible to cope with a situation where the user wants to check the details of the status of the printer.

The CPU 12 can change an acquisition period that is an interval by which the status information is acquired from the printer 31, and sets the status information acquisition period Tw1 when the status screen 70 is displayed to be shorter than the status information acquisition period Tw2 when the top screen 40 or the function execution screens 50 and 60 are displayed. Thereby, when displaying the status of the printer by the user's intention, since the acquisition interval of the status information is shortened, it is possible to suppress lowering in accuracy of the status due to the time lag with respect to the detailed content of the status information.

Modified Embodiment of First Embodiment

The information processing device 10 may not store the label application 21 in the memory 16. In this case, steps S40 to S42 may be omitted in the print filter processing (step S26) shown in FIG. 9

OTHER EMBODIMENTS

The control AP 20 may change the display manner of the badge image that is displayed on the function execution screen based on the status information that is not extracted by the filter processing. For example, in a case where the print processing is selected, when there is an abnormality in the status of the scan processing due to the status information relevant to the scan processing, the control AP 20 changes the display manner of the badge image relevant to the print processing. In this case, the control AP 20 may change a color of the badge image or a shape of the badge image. Thereby, it is possible to cause the user to recognize that there is an abnormality in the status relevant to the function not selected.

As far as the image processing apparatus is capable of receiving the execution instruction of the predetermined image processing from the information processing device via communication with the information processing device, the image processing device is not limited to the printer and the complex machine.

The control AP 20 may display the status in a text form or in a combination form of an icon and a text on the display, instead of displaying the status of the printer by the icon such as the badge image.

The instruction receiving screen that is displayed by the information processing device 10 may be any screen for receiving an instruction that is issued by the user operation, and may be a screen other than the function execution screen.

What is claimed is:

1. A non-transitory computer-readable storage medium storing a control program readable by a computer of an information processing device, the information processing device including a display, an operation unit, and a communication unit and capable of performing communication with an image processing apparatus via the communication unit, and the control program, when executed by the computer, causing the information processing device to perform:
   acquiring status information indicative of a status of the image processing apparatus via the communication unit;
   determining which function of functions of the image processing apparatus is selected;
   performing first display processing in a case where it is determined that none of the functions of the image processing apparatus is selected, the first display processing including displaying, on the display, a status of the image processing apparatus which is based on the acquired status information; and
   performing second display processing in a case where it is determined that any one of the functions of the image processing apparatus is selected, the second display processing including: displaying, on the display, a status of the image processing apparatus which is based on a status information included in the acquired status information and relevant to a first function that is the selected function; and limiting display, on the display, of a status of the image processing apparatus which is based on a status information included in the acquired status information and relevant to a second function that is a function not selected,
   wherein in the first display processing, a function selection screen for receiving a selection operation for selecting each of the functions of the image processing apparatus through the operation unit is displayed on the display, and the status of the image processing apparatus is displayed on the function selection screen on the display,
   wherein the status of the image processing apparatus displayed on the function selection screen is determined based on both the status information relevant to the first function and the status information relevant to the second function, and
   wherein in the first display processing, a status icon is displayed on the function selection screen, and the status icon is associated with and/or includes a badge image, and
      the status of the image processing apparatus displayed on the function selection screen is displayed by the badge image on the function selection screen; and
   wherein in the second display processing, an instruction receiving screen for receiving an instruction to the first function selected from each of the functions of the image processing apparatus displayed on the function selection screen is displayed on the display, and the status of the image processing apparatus relevant to the first function is displayed on the instruction receiving screen on the display;
   wherein in the first display processing, statuses of the image processing apparatus relevant to all functions that can be selected on the function selection screen are displayed as further status icons on the function selection screen,
   wherein in the second display processing, a status of the image processing apparatus relevant to the first function is displayed as an additional status icon on the instruction receiving screen, and
   wherein the control program, when executed by the computer, causes the information processing device to further perform:
      displaying a detailed display screen indicative of details of the status of the image processing apparatus on the display in a case where one of the further status icons is operated on the function selection screen or the additional status icon is operated on the instruction receiving screen based on an operation received by the operation unit;
   wherein in the acquiring of the status information, an acquisition period that is an interval by which the status information is acquired from the image processing apparatus can be changed, and
   wherein the acquisition period when the detailed display screen is displayed is set shorter than the acquisition period when the function selection screen is displayed and shorter than the acquisition period when the instruction receiving screen is displayed.

2. The non-transitory computer-readable storage medium according to claim 1,
   wherein the functions of the image processing apparatus include: an input function of inputting an image; an output function of outputting an image; and an input and output function of outputting an image input by the input function by the output function, and
   wherein in the second display processing, in a case where the input and output function is the first function, a status information included in the acquired status information and relevant to the input function and a status information included in the acquired status information and relevant to the output function are selected, and the status of the image processing apparatus is displayed based on each of the selected status information.

3. The non-transitory computer-readable storage medium according to claim 1,
   wherein the control program, when executed by the computer, causes the information processing device to further perform:
      perform setting to the first function based on an operation received by the operation unit, and
   wherein in the first display processing, a content of the status of the image processing apparatus that is displayed on the display is changed in accordance with the setting.

4. The non-transitory computer-readable storage medium according to claim 1,
   wherein the information processing device further comprises: a memory in which an external program for causing the computer to execute an external function that is a predetermined function is stored,
   wherein the computer is capable of activating the control program under execution of the external program, and
   wherein in the second display processing, in a case where the computer activates the control program in response to an instruction of the external program, the status of the image processing apparatus is displayed by using a function selected by the external program as the first function.

5. The non-transitory computer-readable storage medium according to claim 1,
wherein in the second display processing, the status of the image processing apparatus relevant to the second function is not displayed on the instruction receiving screen.

6. The non-transitory computer-readable storage medium according to claim 1,
wherein in the second display processing, a display manner of the additional status icon that is displayed on the instruction receiving screen is changed based on the status information included in the acquired status information and relevant to the second function.

7. The non-transitory computer-readable storage medium according to claim 1,
wherein in the acquiring of the status information, whether the status information can be acquired from the image processing apparatus is determined, and in a case where it is determined that the status information can be acquired from the image processing apparatus, the status information is acquired from the image processing apparatus.

8. The non-transitory computer-readable storage medium according to claim 1,
wherein in the acquiring of the status information, the status information is not acquired from the image processing apparatus while communication relating to the first function is performed with the image processing apparatus via the communication unit.

9. An information processing device comprising:
a display;
an operation unit;
a communication unit via which the information processing device is capable of performing communication with an image processing apparatus; and
a controller, which includes a control program that is executable by a computer, configured to:
    acquire status information, so as to perform acquiring of such status information, indicative of a status of the image processing apparatus via the communication unit;
    determine which function of functions of the image processing apparatus is selected;
    perform first display processing in a case where it is determined that none of the functions of the image processing apparatus is selected, the first display processing including displaying, on the display, a status of the image processing apparatus which is based on the acquired status information; and
    perform second display processing in a case where it is determined that any one of the functions of the image processing apparatus is selected, the second display processing including: displaying, on the display, a status of the image processing apparatus which is based on a status information included in the acquired status information and relevant to a first function that is the selected function; and limiting display, on the display, of a status of the image processing apparatus which is based on a status information included in the acquired status information and relevant to a second function that is a function not selected,
wherein in the first display processing, a function selection screen for receiving a selection operation for selecting each of the functions of the image processing apparatus through the operation unit is displayed on the display, and the status of the image processing apparatus is displayed on the function selection screen on the display,
wherein the status of the image processing apparatus displayed on the function selection screen is determined based on both the status information relevant to the first function and the status information relevant to the second function, and
wherein in the first display processing, a status icon is displayed on the function selection screen, and the status icon is associated with and/or includes a badge image, and
the status of the image processing apparatus displayed on the function selection screen is displayed by the badge image on the function selection screen; and
wherein in the second display processing, an instruction receiving screen for receiving an instruction to the first function selected from each of the functions of the image processing apparatus displayed on the function selection screen is displayed on the display, and the status of the image processing apparatus relevant to the first function is displayed on the instruction receiving screen on the display;
wherein in the first display processing, statuses of the image processing apparatus relevant to all functions that can be selected on the function selection screen are displayed as further status icons on the function selection screen,
wherein in the second display processing, a status of the image processing apparatus relevant to the first function is displayed as an additional status icon on the instruction receiving screen, and
wherein the control program, when executed by the computer, causes the information processing device to further perform:
    displaying a detailed display screen indicative of details of the status of the image processing apparatus on the display in a case where one of the further status icons is operated on the function selection screen or the additional status icon is operated on the instruction receiving screen based on an operation received by the operation unit;
wherein in the acquiring of the status information, an acquisition period that is an interval by which the status information is acquired from the image processing apparatus can be changed, and
wherein the acquisition period when the detailed display screen is displayed is set shorter than the acquisition period when the function selection screen is displayed and shorter than the acquisition period when the instruction receiving screen is displayed.

* * * * *